United States Patent [19]

Anthony

[11] Patent Number: 4,695,448
[45] Date of Patent: Sep. 22, 1987

[54] REDUCTION AND DISPOSAL OF TOXIC WASTE

[75] Inventor: Myron L. Anthony, Grand Junction, Colo.

[73] Assignee: Grand Junction Reality Co., Inc., Grand Junction, Colo.

[21] Appl. No.: 780,274

[22] Filed: Sep. 26, 1985

[51] Int. Cl.$^4$ .......................... B01J 19/80; F23G 5/10; C01B 13/11

[52] U.S. Cl. ...................................... 423/659; 110/250; 110/345; 210/909; 373/8; 373/9; 422/186.23

[58] Field of Search ................................ 110/250, 345; 423/210 C, 245 S, 659, DIG. 10; 210/908, 909; 373/8, 9; 315/111.21, 111.31

[56] References Cited

U.S. PATENT DOCUMENTS

| | | | |
|---|---|---|---|
| 3,173,388 | 3/1965 | Menrath et al. | 110/250 |
| 3,575,119 | 4/1971 | Marr, Jr. | 110/250 |
| 3,644,782 | 2/1972 | Sheer et al. | 315/111.21 |
| 3,780,675 | 12/1973 | Frye et al. | 110/250 |
| 3,818,845 | 6/1974 | Nakane et al. | 110/250 |
| 3,841,239 | 10/1974 | Nakamura et al. | 110/250 |
| 3,902,071 | 8/1975 | Horowitz | 422/186.28 |
| 4,144,311 | 3/1979 | Grosche et al. | 423/155 |
| 4,242,532 | 12/1980 | Squibbs | 373/9 |
| 4,431,612 | 2/1984 | Bell et al. | 422/186.18 |
| 4,574,714 | 3/1986 | Bach et al. | 110/250 |

FOREIGN PATENT DOCUMENTS

| | | | |
|---|---|---|---|
| 56-77611 | 6/1981 | Japan | 110/250 |
| 2113815 | 8/1983 | United Kingdom | 423/DIG. 10 |

Primary Examiner—Gary P. Straub
Attorney, Agent, or Firm—Kinzer, Plyer, Dorn, McEachran & Jambor

[57] ABSTRACT

Toxic compounds, entrained in water, are dissociated in an electric arc (e.g. 12000° F.) in an airtight chamber charged with oxygen; metal ions ($M^+$) resulting from dissociation are recombined as gaseous oxides ($MO_x$) which are educted from the chamber and disposed of.

11 Claims, 3 Drawing Figures

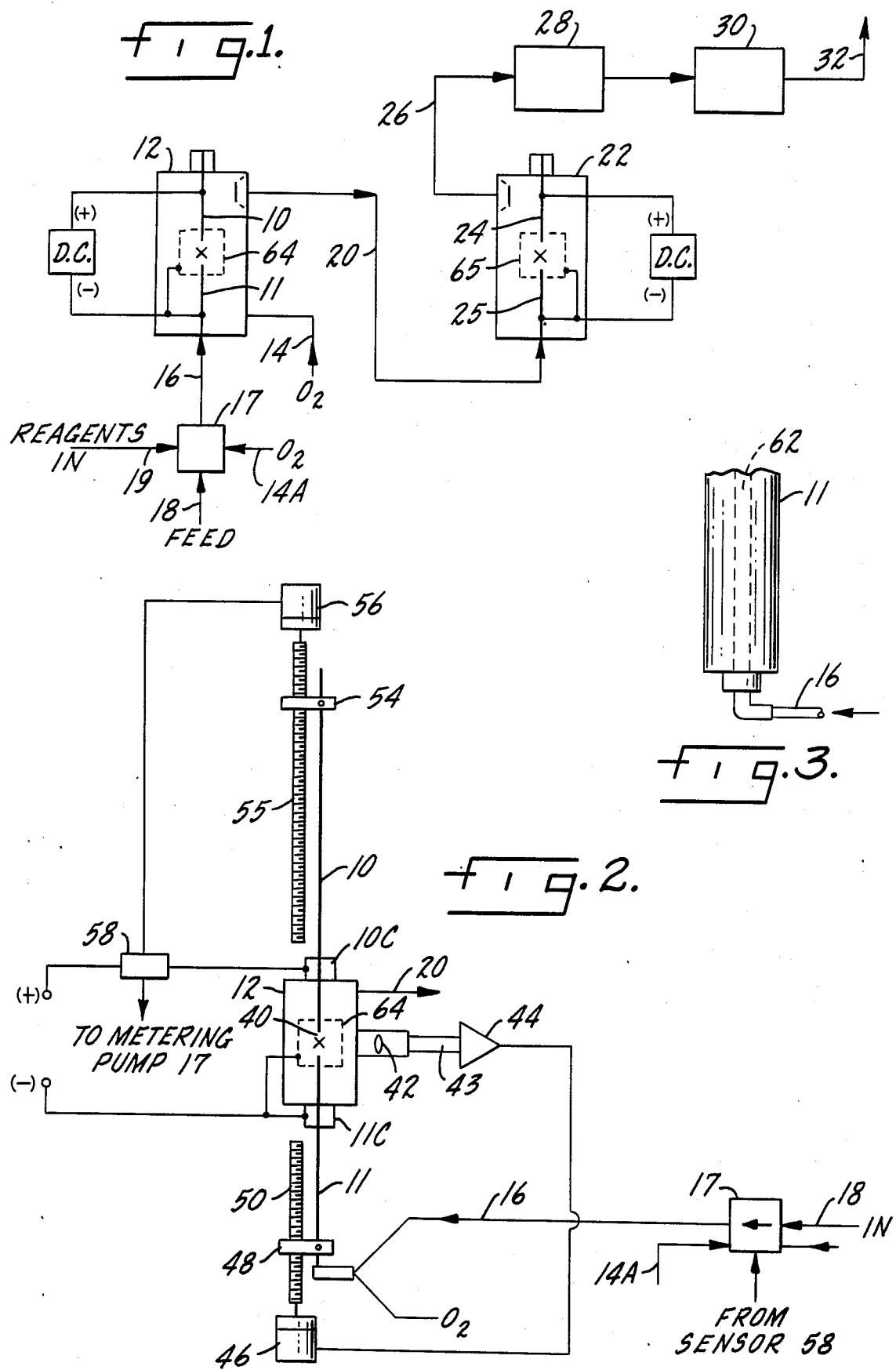

REDUCTION AND DISPOSAL OF TOXIC WASTE

This invention relates to treatment of a body of toxic waste liquid, to oxidize the metal constituent to a gaseous form (e.g. water vapor in the instance of hydrogen metal ions, carbon dioxide in the instance of carbon as the metal constituent, and so on) followed by disposal of the gases thus produced.

Polychlorinated biphenols (PCB) is one of the greatest toxic waste problems prevailing today. This material is very toxic and extremely carcinogenic. There are hundreds of million gallons of this toxic material in various forms in the U.S.A., simply stored in drums and dumps for want of any better disposal method other than incremental incineration which is an expensive and incomplete mode of disposal, particularly in that incineration results in toxic ash and air pollution.

There are other materials (e.g. dioxins) in the same class as PCB, all as various forms of toxic hydrocarbons. Sulphur, nitrogen, potassium and sodium and other harmful elements or compounds may also be involved representing sources of toxic or carcinogenic precursors and, at the very least, noxious gases such as sulphur dioxide and nitrogen oxides which are notorious pollutants resulting from mere incineration.

The primary object of the present invention is to present a more complete method of disposing of toxic waste material which for the sake of brevity may herein be classified as toxic hydrocarbons containing metallic ions (hydrogen and carbon) capable of being oxidized. As mentioned above, the toxic material may contain other metal ions in combined form which for purposes of this disclosure are in the same class as the hydrocarbons. Specifically, it is an object of the present invention to break down the toxic compounds in an electric arc at an exceedingly high temperature in an airtight chamber in which oxygen is introduced, allowing the metal ions to be recombined as oxides in a gaseous state (e.g. water vapor, oxides of carbon, oxides of sulphur and so on) and the gases thus formed are continuously educted from the chamber so that they may be disposed of in different ways as will hereinafter be described.

IN THE DRAWINGS

FIG. 1 is a schematic view of a complete disposal system complying with the principles of the present invention;

FIG. 2 is a more detailed schematic showing of the electric arc system and method of operation for oxidizing the toxic waste; and FIG. 3 is a detail view of a consumable electrode employed under the present invention.

One example of an overall, complete reduction system is shown schematically in FIG. 1. A pair of electrodes 10 and 11 are disposed within a substantially airtight chamber 12. Chamber 12 will be jacketed in insulation, not shown. The electrodes are consumable, carbon or graphite for example, and the gap separation is such that the resultant arc, when current is applied, will produce a temperature in the neighborhood of 12000° F. to 16000° F.

An oxidizing atmosphere (preferably pure oxygen) is introduced into the chamber through a suitable conduit 14. Alternatively, or concurrently, oxygen may be introduced to a metering and mixing pump, via conduit 14A, hereinafter described.

One of the electrodes, as will be shown, has a longitudinal bore opening at the arc gap. The toxic material, contained in a body of water (from storage) is fed from a mixer 17 (metering and mixing pump) to the bore or passage of the electrode by way of conduit 16 so that a jet of toxic material is emitted at the electrode gap where the metal constituents are oxidized. The term "metal" used herein is used strictly in the chemical sense, namely, a positive ion from the atomic table.

The feed solution or mixture containing the toxic material is fed to the mixer 17 from storage via conduit 18 and oxygen may be fed to the mixer concurrently to aid mixing. A reagent may be fed to the mixer 17 through conduit 19 for reasons to be explained.

The oxides formed within chamber 12 are educted by way of a conduit 20 and fed to a second airtight chamber 22 within which a second electric arc is established between a pair of consumable electrodes 24 and 25. Here, in chamber 22, any solid particles that may be carried over from chamber 12 (e.g. graphite fragments) are themselves disintegrated or fractured to even smaller size within the high temperature arc (12000°-16000° F.).

Any small particles solids within chamber 22 (carbon or graphite particles from the electrodes, particles resulting from reagent action, and the like) are of extremely small size and may be educted through a conduit 26. The effluent from chamber 22 is fed to a solids trap 28 and any remnant gas (e.g. $Cl_2$, $SO_2$) is subjected to a gas (aqueous) scrub in chamber 30. Harmless gases are finally fed from the scrubbing chamber 30 to a stack 32. The stream of oxygen admitted to chamber 12 is under pressure and serves as the driving force to educt the chambers.

The reagent admitted to the mixer is to assure that any ions not oxidized in chamber 12 may be combined anew. The chlorine ions in PCB (chlorinated hydrocarbons) for example may be recombined as NaCl by using NaOH as a reagent; silicon or iron may be recombined as a ceramic by using borax as a reagent.

FIG. 2 presents more details of the equipment associated with the first arc chamber 12. A few variations, variants of what was described above in connection with FIG. 1, are also shown in FIG. 2.

The gap 40 between the electrodes 10 and 11 should remain constant as the electrodes are consumed. Consequently the gap is monitored and the electrodes adjusted longitudinally to maintain a substantially constant gap. The gap may widen due to erosion of the cathode 11. Its position is monitored by an optical sensor including a lens 42 and photocell circuitry 43; amplifier 44 emits a resultant signal indicative of an unacceptable wide gap, delivered to a servomotor 46 dedicated to maintaining a datum position for the lower electrode.

Electrode 11 (cathode) is coupled to a feed nut 48 in turn threadedly associated with a feed screw 50 turned by the servomotor 46, advancing the electrode 11 to reposition it.

The upper electrode 10 (anode) is to be constantly positioned for arc stability, unlike the lower electrode (cathode) which is adjusted to maintain a fixed or datum position. In this connection it will be recognized that the upper electrode or anode is a source of positive ions in the sense of an electrical current (not chemical sense) while the lower electrode or cathode is a source of electrons. Because of this difference, the lower electrode is consumed at a considerably less rate compared to the upper electrode.

To adjust the upper electrode for arc stability, it is also coupled to a feed nut, nut 54, in turn threadedly mounted to a feed screw 55. The feed screw 55 is controlled by a servomotor 56. The servomotor 56 is dedicated to maintaining arc stability and under the control of a current sensor 58.

To prevent instability of the arc and the possibility of extinguishing the arc, both the gap and the current should be relatively fixed or constant. Positioning of the cathode, incidental to its erosion, has been explained above. Since the anode is consumed at a greater rate, tending to lengthen the gap, this causes a decrease in the arc current, sensed at sensor 58, and resulting in a corresponding extension of the anode electrode to reduce the gap by way of the servomotor 56 and its screw 55. Thus, the current is responsive to arc performance. Unexpected fluctuations in the current can also result in repositioning of the anode by way of the servomotor 56.

As shown in FIG. 2, the electrodes are provided with water-cooled frictional terminal clamps to which the power lines are connected, these clamps being identified by references characters 10C and 11C.

Sensor 58 also senses or measures the power load of the arc and is used to adjust the metering pump rate to a near minimum which prevents flooding of the gap.

Experience alone, with the particular source of toxic material, will establish the appropriate arc gap current and the related rate of feeding the body of liquid containing the toxic material. When the gap distance and current values are established, sensors 42-43 (optical) and 58 (arc gap current) are set and the feed rate established. Thereafter, sensor 42-43 will assure that the eroding end of the cathode remains in its datum position, while sensor 58, sensing the prevailing current, will deliver signals to servomotor 56 appropriately to adjust the upper electrode to maintain a stablized arc. At the same time, sensor 58 sets the rate for the metering pump 17, which, of course, is a variable rate pump.

As noted above, electrode 11, FIG. 3, is provided with a longitudinal bore identified in FIG. 3 by reference character 62. The upper end of the bore or passage 62 opens at the gap end of electrode 11. The lower end of passage 62 is coupled to conduit 16 which directs the flow of toxic material to passage 62.

The introduction of oxygen by way of conduit 14 (or 14A) FIG. 1, is under pressure sufficiently to force the generated gases, resulting from dissociation of the toxic compound in the arc, out of chamber 12 into the educting conduit 20. Entrained in this flow of gases there may be tiny particles resulting from the electrode erosion. Also, there may be solid particles that may have been entrained in the body of liquid containing the toxic material, and there may be solids resulting from reagent action. These particulate bodies, though tiny, may be further disintegrated in the second chamber 22, FIG. 1. The stream of oxygen under pressure admitted to chamber 12 is also adequate to force the stream of oxide gases and entrained particulate material out of chamber 22, through conduit 26 to the solids trap 28. The educted stream continues to the scrubber 30 as explained above; here such readily soluble gases as $SO_2$, $Cl_2$, $NO_x$ and so on are removed. It may be mentioned at this point, however, that the second chamber 22 and the associated systems downstream thereof are not absolutely essential in practice. It may be sufficient under most circumstances simply to educt the gases and disintegration products from chamber 12, scrub the water soluble gases and permit any solids to settle.

The basic principle is that the electric arc in chamber 12 has enough power to dissociate the toxic compound into its constituent ions. The metal ion (M+) is transformed to a gaseous oxide in the highest state of oxidation ($MO_x$). If needed, a reagent is supplied to recombine the negative ion (e.g. $Cl^-$) resulting from dissociation. Sensors are used to assure a substantially stable arc, a substantially fixed position for the cathode and rate of feed of the toxic compound that will not drown or quench the arc. If need be, solid particles educted from chamber 12 may be fractured to even smaller size in a second electric arc. Hence, while I have illustrated and described preferred embodiments of my invention, it is to be understood these are capable of variation and modification.

Metallic electrodes may also be used. These may contain slag formers (coated electrodes) or other reactive coatings to take the place of or to supplement the reagent introduced at 19. Preferably a cathodic sputter shield or grid is placed at the arc zone area, reference characters 64 and 65, FIGS. 1 and 2.

I claim:

1. A method of oxidizing toxic waste compounds entrained as a stream of toxic waste and including the steps of establishing a high temperature electric arc in the gap presented by and between the opposed ends of a pair of spaced elongated consumable electrodes located within a substantially airtight chamber, the temperature within the arc being of an intensity to dissociate the toxic compound, one of the electrodes having a longitudinal bore which opens at its gap end, feeding a mixture of oxygen and the stream of toxic waste to and through said bore so that a jet of oxygen and toxic waste is emitted at said gap where the toxic compound content is dissociated in the presence of oxygen to form gaseous oxides, and establishing via oxygen introduction sufficient pressure within said chamber to force both particulate matter resulting from electrode erosion and evolved oxide gases as a stream of effluent educted from said chamber for disposal.

2. A method according to claim 1 in which the toxic waste includes a chlorinated hydrocarbon and in which a reagent is fed into the electrode bore for combining with chlorine values resulting from dissociation within said chamber or in which the reagent is carried by an electrode.

3. A method according to claim 1 effluent stream contains particle solids derived from erosion, and including the step of subjecting the effluent stream to an electric arc gap in a second chamber to produce smaller particles.

4. A method according to claim 3 in which contents of the second chamber including gases educted from the first-named chamber and the smaller particles produced in the second chamber are educted and subsequently treated to settle the solids and scrubbed to remove water soluble gases.

5. A method according to claim 1 in which the electrode having the bore is a cathode consumed at less rate than the anode.

6. A method according to claim 5 in which the other electrode is an anode and including the step of adjusting the anode in relation to the arc current to maintain a stable arc as the anode is consumed.

7. Apparatus for oxidizing toxic waste compounds entrained in a fluid stream and converting the dissociated waste to oxides including:

a substantially airtight chamber in which are positioned a pair of opposed consumable electrodes with their opposed ends spaced from one another to afford an arc gap;

means for supplying current to the electrodes to create a high temperature arc in the gap of sufficient intensity to dissociate toxic compounds;

one of said electrodes being a cathode and having a passage therethrough for a feed stream of the toxic waste compound, and means for constantly admitting oxygen under pressure into said passage along with the toxic compounds while concurrently employing an oxygen pressure sufficient to force from said chamber both gaseous oxides formed therein and entrained particles resulting from electrode erosion;

feed means respectively to advance each electrode toward the other;

a monitor for determining the position of the gap end of the cathode and for controlling the cathode feed means to position the gap end of the cathode in a substantially constant datum position as the cathode is consumed;

a sensor for sensing the flow of current to the arc gap and for controlling the feed means for the other electrode to maintain a stable arc; and means to educt said particles along with oxide gases from the chamber for disposal.

8. Apparatus according to claim 7 including a variable rate metering pump to deliver a stream of toxic waste to the cathode, and means to vary the rate of the pump in accordance with the arc current to prevent flooding of the arc.

9. Apparatus according to claim 7 in which the stream of toxic material includes a chlorinated hydrocarbon, said apparatus including means to feed a chlorine reagent into the electrode passage along with oxygen and the stream of toxic waste material, the reagent being a compound reactive with the chlorine derived from dissociation of the toxic compound.

10. Apparatus according to claim 7 including a second airtight chamber containing a pair of electrodes having a gap therebetween, means to communicate the two chambers so that contents in the first-named chamber resulting from dissociation including the attrition particles may be educted as effluent to the second chamber, and means to supply current to the electrodes in the second chamber to produce an arc of sufficient intensity to fracture to smaller size particulate solids educted from and introduced to the second chamber.

11. Apparatus according to claim 7 in which one of the electrodes carries a reagent reactive with the negative ion constituent of the toxic compound.

* * * * *